Patented May 3, 1938

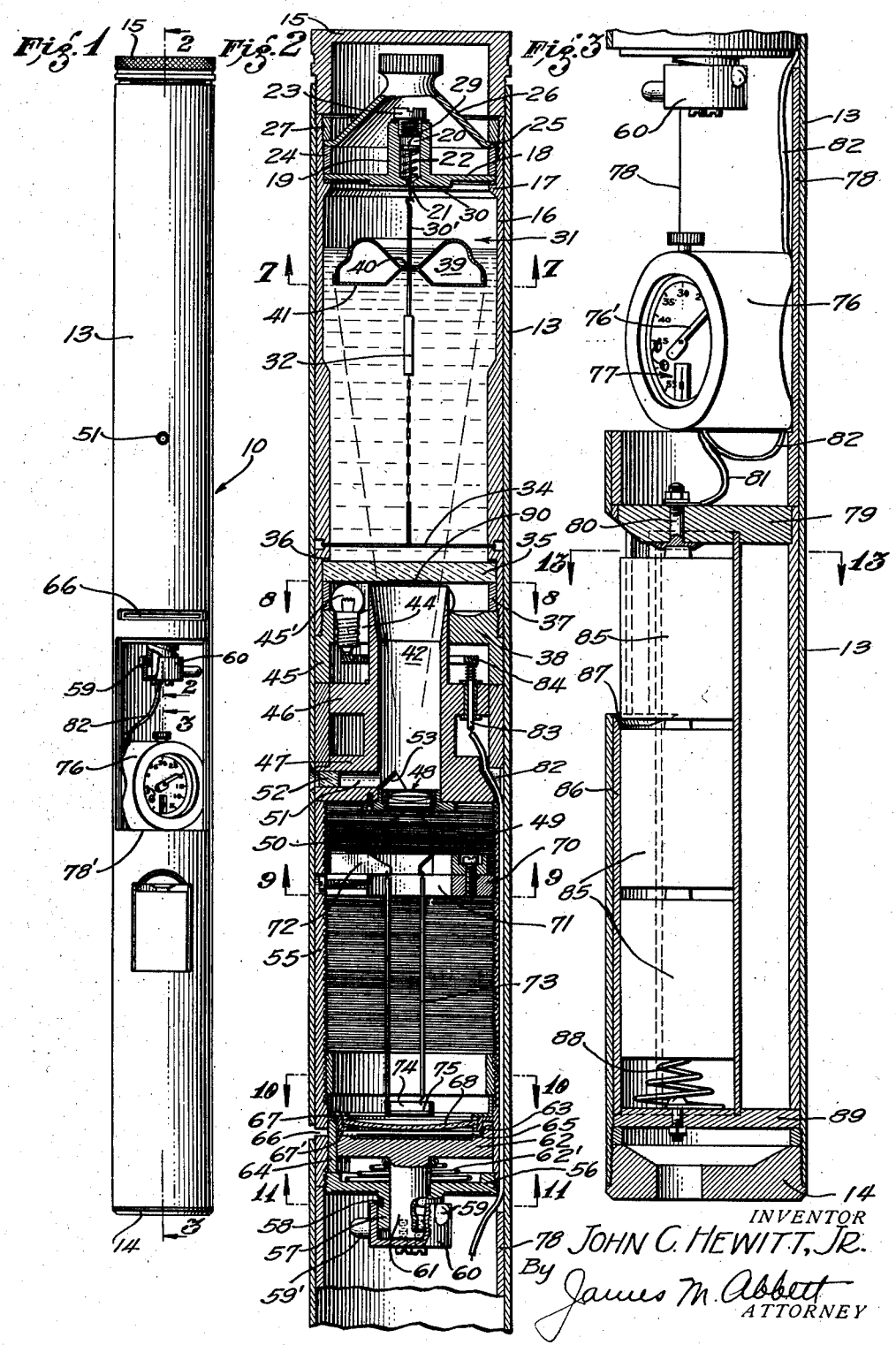
May 3, 1938. J. C. HEWITT, JR 2,116,350
MEANS FOR MEASURING WELL DECLINATIONS
Filed May 16, 1935 2 Sheets-Sheet 1
INVENTOR
JOHN C. HEWITT, JR.
By James M. Abbott
ATTORNEY

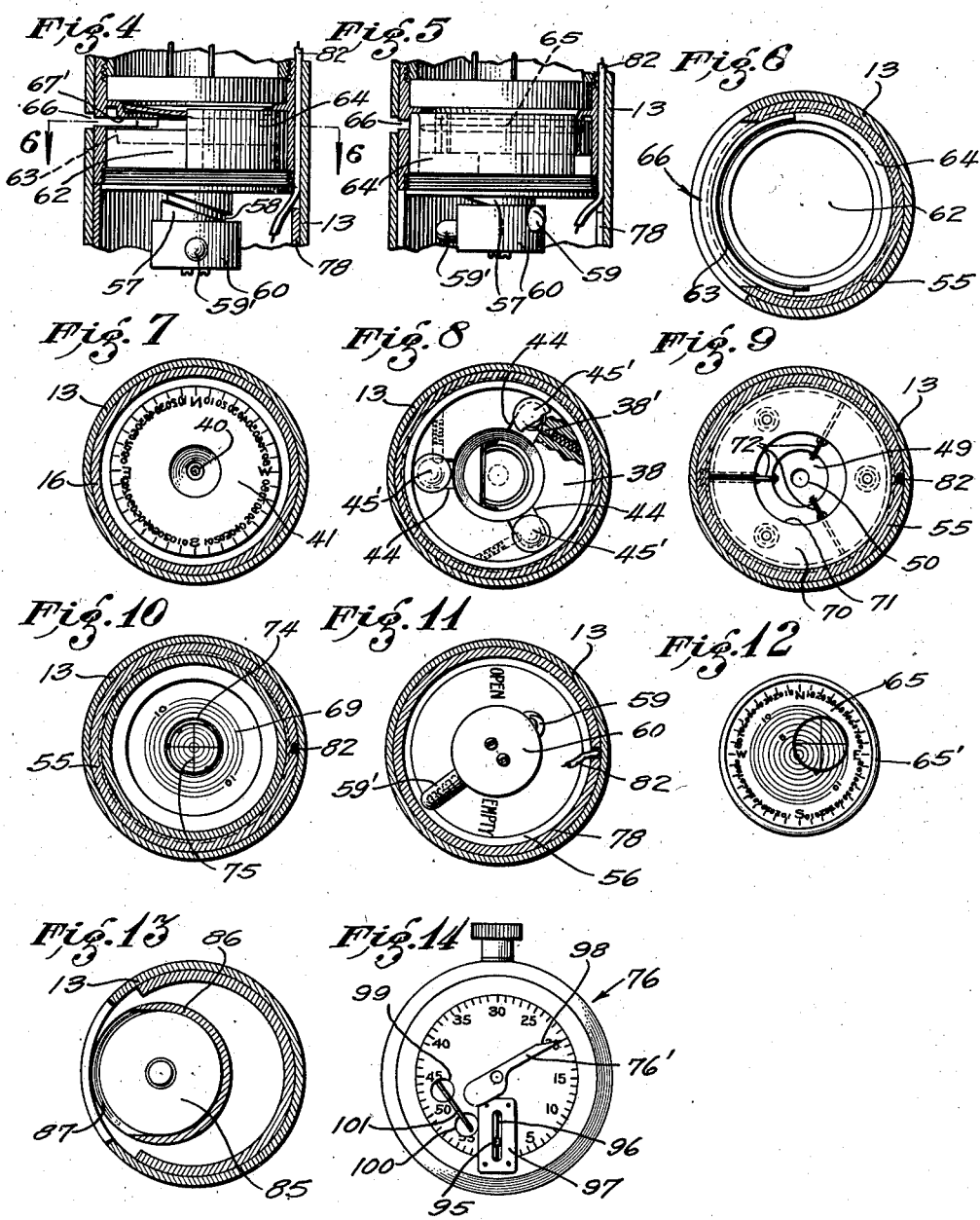

2,116,350

UNITED STATES PATENT OFFICE 2,116,350

MEANS FOR MEASURING WELL DECLINATIONS

John C. Hewitt, Jr., Long Beach, Calif.

Application May 16, 1935, Serial No. 21,829

17 Claims. (Cl. 33—205.5)

This invention relates to a method and means of measuring and surveying, and particularly pertains to a method and means for measuring well declinations and the like, and is a continuation in part of my application entitled Direction indicator for wells, Serial No. 645,600, and filed by me December 3, 1932.

In the drilling of oil wells and the like it has been found that when the well bore penetrates the earth formation there is likelihood that the drilling tool will be deflected in its downward course and will cause an objectionable deviation and declination of the hole being bored. Such a condition is objectionable and every precaution is taken by the driller to insure that the drilled hole will be straight. In order to ascertain the deviation of the drilled hole from the vertical various devices have been provided for measuring the degree of declination of a well bore and for ascertaining the direction of declination. In such a device it is desirable to make an accurate record showing the degree of deviation and the direction of deviation, and it is the principal object of the present invention to provide a method and means of measuring declinations by which a photographic record will be obtained at a desired level, or levels, and which instrument will be quite rugged in its construction so that it may be run into a drilled hole at substantially the same rate of speed as other tools are lowered into a well without danger of injury to the vital parts of the instrument, the structure being further designed to insure that readings may be taken with certainty and with accuracy at selected levels in the well.

The present invention contemplates the provision of a surveying instrument of the class described which includes a compass, declination indicating or designating means, and photographic apparatus for simultaneously producing a record of deviation and direction.

The invention is illustrated by way of example in the accompanying drawings in which:

Figure 1 is a view in elevation showing the completely assembled structure with which the present invention is concerned.

Fig. 2 is an enlarged fragmentary view showing the upper portion of the instrument which includes the photographic unit, the compass, and the deviation indicating means.

Fig. 3 is an enlarged view similar to Fig. 2 showing the lower portion of the instrument which includes the timing unit and the battery section.

Fig. 4 is a fragmentary view in longitudinal section and elevation showing the photographic disc holder in its opened position.

Fig. 5 is a view similar to that shown in Fig. 4 indicating the photographic disc holder in its closed position.

Fig. 6 is a view in transverse section through the disc holder as seen on the line 6—6 of Fig. 4.

Fig. 7 is a view in transverse section through the instrument as seen on the line 7—7 of Fig. 2 and viewed in the direction of the arrows, said view showing the compass disc carried on the under face of the compass float.

Fig. 8 is a view in transverse section through the instrument as seen on the line 8—8 of Fig. 2 showing the arrangement of the light bulbs and their holders and also the photographic unit.

Fig. 9 is a view in transverse section through the instrument as seen on the line 9—9 of Fig. 2 viewed in the direction of the arrows and discloses the mounting for the reticle unit.

Fig. 10 is a view in transverse section through the instrument as seen on the line 10—10 of Fig. 2 and discloses the position of the reticle with relation to the glass disc thereunder through which the photographic image is projected on to the photographic disc.

Fig. 11 is a view in transverse section as seen through the instrument on the line 11—11 of Fig. 2 and discloses the means provided to indicate the position of adjustment of the photographic disc holder.

Fig. 12 is a view in plan showing the final appearance of the photographic disc with a typical reading thereon.

Fig. 13 is a view in transverse section through the instrument as seen on the line 13—13 of Fig. 3 and shows the manner in which the batteries are loaded into the instrument and maintained.

Fig 14 is a view in front elevation showing the face of the timing clock and the timing structures associated therewith.

Referring more particularly to the drawings 10 indicates the entire instrument embodying the present invention. The instrument is enclosed within an armored casing (not shown in the drawings) which is lowered into the well bore on a suitable supporting member. The instrument 10 is formed with an outer cylinder and tubular barrel 13, the lower end of which is closed by a bottom plug 14 and the upper end of which is closed by a removable cap 15. Mounted within the upper end of the barrel 13 is a tubular lining 16 which adjacent its upper end is formed with an internal shoulder 17. This shoulder provides a seat for a disc 18 which is formed with a central tubular boss 19 upstanding therefrom. A central passageway 20 is formed within the boss and terminates at its lower end in an outlet opening 21 of reduced diameter, thus forming a shoulder upon which a coil spring 22 may rest. The upper central passageway 20 is threaded to receive a closing screw 23. A holding ring 24 fits within the upper end of the liner 16 and is held in position by flange 25 of an inverted conical cap 26 which provides an internal closure member for the barrel. The cap is held down upon its seat by a threaded ring 27 engaging threads within the liner. A suitable washer 28 may be interposed between the shoulder 17 and the disc 18 for packing purposes if desired. A washer 29 is slidable within the passageway 20 and receives the upper end of chain 30. This extends downwardly into a compass compartment 31 which is enclosed by the liner 16. The lower end of the chain 30 is connected to a wire 30' which is fitted at its lower end with a coupling 32 which engages a chain 33 connected to a cross member 34. This wire extends diametrically across the compass compartment 31 adjacent its lower end and anchors the chain 33 so that the spring 22 will maintain the chain 30, the wire 30', and the chain 33 under yieldable tension for a purpose to be hereinafter set forth. The lower end of the compass compartment 31 is formed by a glass disc 35 which provides a floor for the compass compartment and which is held against a packing ring 36 to prevent leakage of liquid from the compartment. A spacing ring 37 supports the glass bottom wall 35 in position and rests upon the upper end of a light bulb holder 38, to which the lower end of the liner 16 is threaded. The compass compartment is suitably filled with a liquid which may if desired be of low surface tension. Strung on to the wire 30' within the compass compartment is a compass float 39 buoyantly supported by the liquid, and which is free to move universally with relation to the wire 30' and will be guided by the wire 30' and will be cushioned against lateral movement by the tension of spring 22. This spring will act to permit lateral yielding movement of the compass float 39 in the event the instrument is jarred as it is lowered into or withdrawn from the hole, and will draw the chains 30 and 33 and the wire 30' taut after impact to hold the compass float so that it will not bind within the compartment. A central bearing 40 is carried on the float for providing a suitable sliding guide for the wire 30'. Disposed on the under face of the compass float 39 is a compass disc or card 41 which as shown in Fig. 7 of the drawings shows degrees of graduation of a compass around its marginal edge. These graduations are reversed on the compass disc since they are later photographed in a manner to be hereinafter described.

The light bulb holder 38 abuts against spacing ring 37 beneath the lower face of the glass partition 35 and is formed with a central opening to receive light tube 42. An opening through the tube 42 is longitudinally aligned with the barrel 13 and is disposed centrally thereof. The bulb holder 38 has a downwardly extending cylindrical portion 45 which fits snuggly within the barrel 13. As shown in Fig. 8, slots 44 in the bulb holder 38 receive electric light bulbs 45'. These are held in position by yieldable means such as spring pressed balls 38'. An intermediate spider 46 upon which the cylindrical portion 45 rests carries electrical contact means for said light bulbs. A lower spider 47 of the light tube structure supports a lens 48 which is disposed across the lower end of the light tube 42. Directly beneath the lens piece 48 is an aperture disc 49 having a central light aperture 50 therethrough.

The spider 47 is formed with a radially extending observation port 51 at the outer end of which is a transparent closure 52 by which it will be possible to look into the light tube 42 where a beam of light will strike a reflector or prism 53 making it possible for the instrument to be tested as to adjustment and lighting circuits before it is placed in the well. It may be found desirable to use a photographic safety glass in constructing the closure 52 to prevent actinic rays of daylight from entering the instrument and possibly spoiling the film. The structure of light tube 42 is secured at the lower end of the liner 16. Directly beneath the light tube structure 42 is a spacing ring 54 which is interposed between the lower end of the light tube housing 38 and an inner sleeve 55.

The sleeve 55 extends downwardly within the barrel and is closed at its lower end by a wall 56 formed with a downwardly extending tubular boss 57 as a part thereof. A helical groove 58 is formed around the outer face of the boss 57 and receives the end of an operating pin 59 which is mounted upon a cap 60 vertically reciprocable upon the boss 57 as the cap rotates therearound. The cap 60 is fastened to the lower end of a stem 61 which slides through the boss 57 and is carried at the lower end of a film placing plunger 62. This plunger is disc shaped having a substantially semi-circular outer flanged edge 63 which fits snugly within the sleeve 55. The upper face of the plunger 62 is therefore formed with a recess to receive a photographic plate or disc, such as indicated at 65 in Fig. 12. The semi-circular flange 63 is supplemented by a semi-circular member 64 which partially circumscribes the back of the disc 62 and with relation to which the disc 62 with its forward flange 63 moves longitudinally as the disc, the flange 63, and the member 64 rotate. The disc is also indicated in solid lines in Fig. 2 of the drawings. The photographic plate or film 65 is here shown as made of a circular disc of sensitized paper. The photographic disc 65 is formed with a marginal frame 65' which provides a centering bead or flange around the entire perimeter of the disc. A radially extending slot 66 is formed through the side wall of the barrel 13 and the sleeve 55 to permit the photographic disc 65 to be slid into position when the plunger 62 is retracted. The plunger 62 with its flange 63 is designed to move upwardly in a position to bridge the slot 66 and exclude light from the interior of the photographic structure when desired.

Attention is directed to the fact as shown in Figs. 2 and 5 of the drawings that the semi-circular member 64 is of a width to always bridge the slot 66 and will move to a bridging position as the disc 62 is rotated from the position shown in Fig. 4. By this means the disc 65 will be held in a light sealed compartment and fixed in a sharply focussed position with relation to the photographic image.

Mounted within the sleeve 55 is a frame member 67 which extends downwardly and terminates in an annular ring 67' seated within the confines of the disc frame 65' and against which the photographic disc abuts when in position. The frame also carries a transverse glass plate 68 here shown as being concaved with relation to the photographic image and which plate is formed with a plurality of concentric circles, the photographic shadow graphs of which are shown at 69 in Fig. 12 of the drawings. Attention is directed to the fact that in the uppermost position of the disc 62 the semi-circular members 63 and 64 extend upwardly around the member 67' to form a light seal in conjunction with the same.

Disposed at the upper end of the sleeve 55 is a ring 70 which is threaded into the end of the sleeve and is provided with a central light opening 71. Extending radially and inwardly from the wall of the opening 71 is a plurality of narrow arms 72 preferably three in number. These arms support suspending wires 73 which are connected to the arms. The lower ends of the wires 73 pivotally support a reticle ring 74 carrying cross wires 75, shadow graphs of which are seen in Fig. 12 of the drawings.

Disposed within the section of the barrel below the sleeve 55 and the cap 60 is a timing clock 76 which may be set as desired to defer closing of electric circuits in the machine until a predetermined time has elapsed. A switch 77 is controlled by the clock and may be of any desired type. The clock is enclosed within the sleeve member 78 fitting within the barrel 13. A transverse partition 79 is positioned below the sleeve 78 and carries an electric terminal 80 connected by a conductor 81 with the switch 77. A conductor 82 also connects with a switch and is led upwardly to a terminal 83 which engages a spring pressed contact ring 84 circumscribing the light tube 42 and by which an electric circuit is completed to one terminal of the electric light bulbs 45. The member 80 extends downwardly through the partition wall 79 and contacts with the upper terminal of one of a series of dry cell batteries 85. The dry cells are here shown as being three in number disposed end to end within a tubular holder 86. This holder has a cutaway portion 87 permitting the dry cells to be separately inserted therein. A spring 88 is interposed between the lowermost of the dry cells and a bottom member 89 by which a ground contact is made to the barrel 13 and other metallic parts in electric connection therewith.

In operation of the present invention the structure is assembled as shown in the drawings. Before the device is loaded the compass float compartment 31 has been filled to a suitable level with liquid. The compass float will thus seek its proper buoyant level within the liquid with the compass disc 41 presented face downwardly. Attention is called to the fact that due to this arrangement there is no possibility for surface reflection of the liquid for the disc 41 is submerged in the liquid and is of course in constant intimate contact therewith. To test the instrument the time clock may be adjusted through opening 78' so that its hand 76' is at zero, at which time an electric circuit will be made through the light bulbs 45' to project their beams upwardly through the glass floor of the compass float 39. By observing through the glass window 52 in the observation port 51 with the aid of the reflector 53 it is possible for the operator to ascertain whether or not the lighting circuits are completed properly to illuminate the compass disc 41. After this test has been made, the photographic disc 65 may be loaded into the instrument through the slotted opening 66 by rotating the plunger 62 with its cap 60 to retract the plunger. This action will move the semicircular member 64 to uncover the passageway 66 and to permit the photographic disc 65 to be introduced into the annular recess 64. The photographic disc 65 may be loaded into the instrument in various ways. A convenient method of day light loading may be obtained by the use of my photographic plate loading device as shown in my U. S. Letters Patent 2,027,642, issued to me January 14, 1936, and entitled "Photographic plate and apparatus for loading the same". A reverse rotation of the plunger and the cap by knob 59' will force the plunger upwardly so that its semicircular flange 63 will embrace a portion of the member 67' and the member 64 will seal the opening 66 and so that the photographic disc 65 will abut directly against the lower face of the frame member 67 to be centered by the semicircular flange 63 of plunger 62, the member 64 and the ring 67'. The time clock 76 may then be set to determine any period of elapsed time by movement of the hand 76' and the instrument will be ready for placement within its armored casing and lowered into the hole on a suitable support. When the instrument has been lowered to a proper depth and the set period of time has elapsed, a circuit will be made from the batteries 85 through conductors 81 and 82 and the switch 77 to the terminals 83 and the spring pressed contact ring 84 to one terminal of each of the lights 45'. The circuits through the light bulbs will be completed from the other terminal of the lights to ground. This will illuminate the under face of the compass disc 41 and cause the reflected light to pass downwardly as indicated by the dotted lines in Fig. 2. Attention is directed to the fact that at the center of the glass partition 35 there is a frosted spot 90 which will obstruct the passageway of reflected light from the center portion of the compass float 39. Diffused light will, however, pass through this frosted center spot so that proper exposure will be made on the photographic disc 65 without having the shadow graph of the reticle obliterated in any way by photographic images of the center portion of the float and suspending means. The light which passes downwardly through the light tube 42 will pass through the aperture 50 of the disc 49 and then downwardly to fall upon the photographic disc 65. In the path of travel of the light beam from the aperture 50 to the photographic disc the light will be obstructed by the reticle ring 74, the reticle wires 75, and the graduations 69 which are ground upon the glass member 68. It will be assumed for purposes of illustration that the upper end of the instrument is inclined toward the northeast as indicated in Fig. 12 of the drawings. This will cause the float 39 to assume an inclination so that it will maintain its horizontal alignment and will also cause the reticle assembly 74 to swing in the same direction so that the supporting wires 73 are vertical and the reticle is horizontal. The members 73 support the reticle for universal swinging movement as effected by gravity. The float will also assume its normal position with relation to magnetic north. The photograph thus taken would be as generally indicated in Fig. 12 of the drawings where the compass graduations from the compass disc 41 will appear around the margin of the photograph disc 65 and substantially concentric therewith. The declination graduations 69 will appear concentric upon the photographic disc and the image of the ring 74 and the reticle wires 75 will be displaced with relation to the center of the disc according to the degree and direction of declination of the hole, so that the intersection of the reticle wires 75 and the center of the disc may be used as reference marks in determining the declination and relationship of these marks to each other, and the compass graduations will indicate the geographical direction of deviation. When the instrument is withdrawn from the well bore the photographic disc 65 may be removed and upon it will be photographically recorded a direct reading shadow graph of the reticle ring and its wires, the graduations on the disc 68 and graduation from the compass card.

Attention is directed to Fig. 11 of the drawings where operating mechanism of the film placing plunger 62 is shown. This structure makes it possible to determine whether or not a film has been loaded into the instrument. This is due to the fact that the member 60 rotates as the plunger 62 is depressed or retracted against the action of spring 62'. It is, therefore, possible to ascertain by the rotated position of the member 62 with relation to the hub, or the rotated position of the nob 50' with relation to certain index marks, such as "closed", "open" or "empty" as shown in Fig. 11 of the drawings, as to whether the plunger 62 is in an open position, a closed position with the film in place, or an empty position with no film within the plunger 62. By the arrangement of the photographic disk holder it will be insured that the disk will be properly centered within the structure and will be held firmly and in focus with the photographic image of the float. Attention is also directed to the fact that since the float is buoyantly supported by the liquid there will be a damping effect which will tend to maintain the float motionless while the photographic exposure is being made, thus producing a well defined photographic image upon the photographic disk.

By reference to Fig. 3 it would be seen that the time clock is provided with a contact member 95 which is mounted upon a guide wire 96 connected to wire 81. The contact member and the wire are supported by a plate of dielectric material 97 so that they will be electrically insulated from the clock. The contact member 95 may be moved lengthwise of the wire 96 to any desired adjusted position and is encountered by the hand 97' as it travels around the face of the dial. Attention is directed to the fact that the point of the hand is tapered as indicated at 98 so that by adjusting the contact 95 radially of the dial it is possible to vary the duration of contact of the hand with the contact member 95. After the hand has met and broken the electric circuit from wire 81 to 82, it is desirable to stop the clock. This is done by providing openings 99 and 100 in the face of the dial. A loop of wire 101 is secured at one end of the hand face of the dial and is brought upwardly through opening 99 and then downwardly through opening 100. The free end of the wire when depressed encounters the escapement mechanism of the clock and this stops the clock when the hand reaches this point. This insures that the clock will not be accidentally started, and, furthermore, this insures that the clock will not continuously run after making one exposure, for another exposure might thus be made to spoil the film.

It will thus be seen that the device here disclosed provides compact and rugged means for quickly and accurately ascertaining the direction of and degree of deviation of a well bore and for making a permanent photographic record of said reading.

While I have shown the preferred form of my invention, as now known to me, it will be understood that various changes might be made in the combination, construction, and arrangement of parts, by those skilled in the art, without departing from the spirit of the invention as claimed.

Having thus described my invention what I claim and desire to secure by Letters Patent is:

1. A well surveying instrument comprising a housing adapted to be lowered into a well bore, a buoyantly floating compass within said housing, a photographic element disposed in focus with said floating compass, and means for illuminating a lower submerged surface of the floating compass and for obtaining a photographic image of said submerged surface upon the photographic element.

2. In a surveying instrument, a housing, a photographic element carried thereby, a liquid container within the housing and thereabove having a transparent bottom wall, a buoyantly floating compass having a compass face submerged in the liquid of said container, and means disposed between the photographic element and the transparent bottom wall of the liquid container for directly illuminating the submerged compass face of said floating compass to produce a photographic exposure thereof upon the photographic element.

3. A well declination measuring instrument comprising a tubular housing, a liquid compartment in the upper end thereof provided with a transparent bottom wall, a compass floating in the body of liquid contained within said compartment, said compass having degree graduations on its submerged face, a photographic lens disposed below said transparent wall, and means for supporting a photographic element below said lens to photograph the submerged face of the compass.

4. A well declination measuring instrument comprising a tubular housing, a liquid compartment in the upper end thereof provided with a transparent bottom wall, a compass floating in the body of liquid contained within said compartment, said compass having degree graduations on its submerged face, a photographic lens disposed below said transparent wall, means for supporting a photographic element below said lens to photograph the submerged face of the compass, and guide means for longitudinally centering the compass as it is buoyantly supported by said liquid.

5. A well declination measuring instrument comprising a tubular housing, a liquid compartment in the upper end thereof provided with a transparent bottom wall, a compass floating in the body of liquid contained within said compartment, said compass having degree graduations on its submerged face, a photographic lens disposed below said transparent wall, means for supporting a photographic element below said lens to photograph the submerged face of the compass, and yieldable guide means for longitudinally centering the compass as it is buoyantly supported by said liquid.

6. A well surveying instrument comprising a tubular body, a liquid compartment therein provided with a transparent bottom wall, a light tube extending longitudinally beneath said bottom wall, means for supporting a photographic element in focus beneath the light tube, a compass floating within the liquid of the liquid container and having a submerged face carrying graduations representing magnetic degrees, and gravity maintained means interposed between the light tube and the photographic element adapted to be maintained vertically while the instrument assumes the angle of declination of the well bore to indicate deviation of the instrument from a perpendicular position whereby a photographic exposure of the submerged compass face will simultaneously cause said face and the deviation indicator to be photographed upon the photographic element to preserve their indications in a permanent record.

7. A well surveying instrument comprising a tubular body, a liquid compartment therein provided with a transparent bottom wall, a light tube extending longitudinally beneath said bottom wall, means for supporting a photographic element in focus beneath the light tube, a compass floating within the liquid of the liquid container and having a submerged face carrying graduations representing magnetic degrees, gravity maintained means interposed between the light tube and the photographic element adapted to be maintained vertically while the structure assumes the angle of declination of the well bore to indicate deviation of the instrument from a perpendicular position whereby a photographic exposure of the submerged compass face will simultaneously cause said face and the deviation indicator to be photographed upon the photographic element, and means disposed between the gravity maintained deviation indicating member and the photographic element whereby a scale representing degrees of deviation will be simultaneously photographed upon the photographic element.

8. A well surveying instrument adapted to record data designating degree and direction of declination of said instrument which comprises a buoyantly supported compass disposed adjacent the upper end of said instrument, means for supporting a photographic element disposed adjacent the lower end of said instrument, a photographic lens interposed between the compass and said photographic element, directly acting illuminating means for the graduated face of said compass whereby light rays will be projected thereto and reflected therefrom through the lens to the plate, time operated means for establishing and interrupting an electric circuit for the illuminating means, and a gravity operated declination element interposed between the photographic lens and the photographic element whereby the magnitude and direction of declination of the instrument may be simultaneously indicated upon the photographic element.

9. A device for recording data photographically in making a well survey which includes an elongated housing adapted to be lowered into a well bore to assume substantially longitudinal alignment with the wall of said bore, a buoyantly supported compass element within the housing having compass degrees on one of its faces, means universally mounting said compass for rotational and inclinational movement while thus buoyantly supported, a photographic lens in focus with said compass chart, a reticle ring upon the opposite side of the photographic lens from the compass, means suspending said reticle ring with relation to the housing whereby it maintains a vertically aligned position by gravity, a reticle glass below the ring having concentric declination graduations thereon, a plain sensitized photographic element below the reticle glass, and means disposed between the compass element and the lens for illuminating the compass chart whereby its image will be projected through the lens and the reticle glass on to the photographic element, and the shadow of the reticle ring will be within the beam of said light so that the image of the compass chart, the shadow of the reticle ring, and the concentric reticle circles, will simultaneously appear on the photographic element when the exposure is made.

10. A well surveying instrument comprising a housing adapted to enter a bore hole, means for supporting a photographically sensitized member within the housing, a compass located within the housing, means for illuminating the compass, a lens mounted between said member and compass and arranged to project an image of the compass on said member, and a pendulum located between the lens and said member and having a portion adjacent the member so that the position of the pendulum may be recorded as the shadow of said portion on the member.

11. A well surveying instrument comprising a housing adapted to enter a bore hole, means for supporting a photographically sensitized member within the housing, a compass located within the housing, means for illuminating the compass, a lens mounted between said member and compass and arranged to project an image of the compass on said member, and means movable in accordance with the slope of the instrument located between the lens and said member adjacent said member so that the position of said movable means may be recorded as a shadow on the member.

12. A well surveying instrument comprising a housing adapted to enter a bore hole, means for supporting a photographically sensitized member within the housing, a compass located within the housing, means for illuminating the compass, a lens mounted between said member and compass and arranged to project an image of the compass on said member, means movable in accordance with the slope of the instrument located between the lens and said member adjacent said member, and a transparent element carrying a scale indicative of movements of said movable means also located between the lens and said member adjacent said member, so that the position of said movable means and said scale may be recorded as a shadow on the member.

13. A well surveying instrument comprising a housing adapted to enter a bore hole, means for supporting a photographically sensitized member within the housing, a compass located within the housing, means for illuminating the compass, a lens mounted between said member and compass and arranged to project an image of the compass on said member, and a pendulum located between the lens and said member and having a portion adjacent the member so that the position of the pendulum may be recorded as the shadow of said portion on the member, said pendulum having a plurality of supporting means located substantially distant from the axis of said lens so as not to interfere with the image of the pendulum on the member.

14. A well surveying instrument comprising a housing adapted to enter a bore hole, means for supporting a photographically sensitized member within the housing, a compass located within the housing and presenting towards the sensitized member a surface carrying markings, a lens mounted between said member and compass and arranged to project an image of the compass markings on said member, means for illuminating the marked surface of the compass so that light reflected from said surface reaches said lens, and means movable in accordance with the slope of the instrument located between the lens and said member adjacent said member so that the position of said movable means may be recorded as a shadow on the member.

15. A well surveying instrument comprising a housing adapted to enter a bore hole, means for supporting a photographically sensitized member within the housing, a compass located within the housing, means for illuminating the compass, means movable in accordance with the slope of the instrument located between the compass and said member, and means for projecting on said member images of both the compass and said movable means, said projecting means comprising a lens between the compass and the movable means forming an image of the compass adjacent the movable means.

16. A well surveying instrument adapted to record data designating degree and direction of declination of said instrument which comprises a buoyantly supported compass disposed adjacent the upper end of said instrument, means for supporting a photographic element disposed adjacent the lower end of said instrument, a photographic lens interposed between the compass and said photographic element, directly acting illuminating means for the graduated face of said compass whereby light rays will be projected thereto and reflected therefrom through the lens to the element, time operated means for establishing and interrupting an electric circuit for the illuminating means, and a gravity operated declination element interposed between the photographic lens and the photographic element and in the path of the beam of light reflected from the compass card through the lens to the photographic element whereby the magnitude and direction of inclination of the instrument may be simultaneously designated upon the photographic element, and a reticle glass having concentric declination graduations interposed between the photographic lens and the photographic element and in the path of said light beam whereby concentric circles will be photographed upon the photographic element to designate the degree of declination of the instrument.

17. A well surveying instrument adapted to record data designating degree and direction of declination of said instrument which comprises a buoyantly supported compass disposed adjacent the upper end of said instrument, means for supporting a photographic element disposed adjacent the lower end of said instrument, a photographic lens interposed between the compass and said photographic element, directly acting illuminating means for the graduated face of said compass whereby light rays will be projected thereto and reflected therefrom through the lens to the element, time operated means for establishing and interrupting an electric circuit for the illuminating means, a gravity operated declination element interposed between the photographic lens and the photographic element and in the path of the beam of light reflected from the compass card through the lens to the photographic element whereby the magnitude and direction of declination of the instrument may be simultaneously designated upon the photographic element, a reticle glass having concentric declination graduations interposed between the photographic lens and the photographic element and in the path of said light beam whereby the shadow of concentric circles will be photographed upon the photographic element to designate the degree of declination of the instrument, and reticle cross wires carried by the declination indicator, the shadow of which wires will be simultaneously photographed upon the photographic element.

JOHN C. HEWITT, Jr.